United States Patent
Shapiro et al.

(10) Patent No.: US 8,218,604 B2
(45) Date of Patent: Jul. 10, 2012

(54) INTERFERENCE CANCELING CDMA MOBILE STATION RECEIVER

(75) Inventors: Jerome M. Shapiro, Belmont, MA (US); James P. Dunyak, Lexington, MA (US)

(73) Assignee: The Mitre Corporation, McLean, VA (US)

( * ) Notice: Subject to any disclaimer, the term of this patent is extended or adjusted under 35 U.S.C. 154(b) by 250 days.

(21) Appl. No.: 12/588,670

(22) Filed: Oct. 23, 2009

(65) Prior Publication Data

US 2010/0040035 A1    Feb. 18, 2010

Related U.S. Application Data

(60) Division of application No. 11/011,757, filed on Dec. 15, 2004, now Pat. No. 7,627,021, which is a continuation-in-part of application No. 10/765,202, filed on Jan. 28, 2004, now Pat. No. 7,099,378.

(60) Provisional application No. 60/443,655, filed on Jan. 30, 2003.

(51) Int. Cl.
 *H04B 1/00* (2006.01)
(52) U.S. Cl. .................. 375/148; 375/144; 375/346
(58) Field of Classification Search .................. 375/136, 375/144, 147–148, 346–350
 See application file for complete search history.

(56) References Cited

U.S. PATENT DOCUMENTS

| | | | |
|---|---|---|---|
| 5,099,493 A | 3/1992 | Zeger et al. | |
| 6,442,154 B1 | 8/2002 | Bottomley | |
| 6,826,140 B2 | 11/2004 | Brommer et al. | |
| 2002/0184278 A1* | 12/2002 | Menkhoff | 708/313 |
| 2003/0048800 A1 | 3/2003 | Kilfoyle et al. | |
| 2004/0005897 A1 | 1/2004 | Tomoe et al. | |
| 2004/0013171 A1 | 1/2004 | Pan et al. | |
| 2004/0071197 A1 | 4/2004 | Lin | |

OTHER PUBLICATIONS

Abrams, B.S. et al., "Efficiently Structured CDMA Receiver with Near-Far Immunity," IEEE Transactions on Vehicular Technology, Feb. 1995, 44(1), pp. 1-13.

Aziz, A. et al., "W-CDMA RAKE Receiver Comes to Life in DSP," www.EETimes.com, Nov. 19, 2003.

Dunyak, J. et al., "A Chip-Level Interference Cancellation Technique for CDMA," Submitted to IEEE WCNC, 2003.

Dunyak, J. etal., "Multiuser Detection Using Interference Cancellation at Each Chip," Proceedings of the IEEE ISWC, Sep. 23-24, 2002.

Dunyak, J., "Multiuser Detection of pulse Amplitude Modulation CDMA Using a Decoupled Kalman Filter Technique," Submitted to IEEE VTC, Sep. 24-28, 2002.

(Continued)

*Primary Examiner* — Curtis Odom
(74) *Attorney, Agent, or Firm* — Rader Fishman & Grauer, PLLC

(57) ABSTRACT

A receiver that provides interference cancellation in conjunction with RAKE processing. Signal parameters corresponding to each of a plurality of fingers corresponding to RAKE processing are maintained. Synthesized pilot signals are estimated using the signal parameters by interpolating waveforms for respective ones of the plurality of synthesized pilot signals to a common sampling lattice of the received set of data, and are then cancelled out. According to another aspect, a receiver ensures completion of a time-critical process such as signal demodulation and adaptively applies a non-time-critical process such as interference cancellation to the extent that computational resources become available subject to ensuring the completion of the time-critical process.

21 Claims, 6 Drawing Sheets

OTHER PUBLICATIONS

Dunyak, J. etal., "A Decoupled Kalman Filter Technique for Multiuser Detection of Pulse Amplitude Modulation CDMA," Proceedings of the WOC, Jul. 17-19, 2002.

Dunyak, J. et al., "A Kalman-PIC Multistage Technique to Reduce Multiaccess Interference," Proceedings of the IEEE ISWC, Sep. 23-24, 2002.

Flanagan, B. et al., "Performance of a Joint Kalman Demodulator for Multiuser Detection," Proceedingsof IEEE VTC, Sep. 24-28, 2002.

Lim, T.J. et al., "An Asynchronous Multiuser CDMA Detector Based on the Kalman Filter," IEEE Journal on Selected Areas in Communications, Dec. 1998, 16(9), pp. 1711-1722.

Suprin, C. et al., "A Kalman Filter Approach to Joint Channel Estimation and Multiuser Detection," Submitted to WOC, Jul. 17-19, 2002.

Verdu, S., "Multiuser Detection," Cambridge University Press, 1998, pp. 1-393.

* cited by examiner

INTERFERENCE CANCELING CDMA MOBILE STATION RECEIVER

CROSS REFERENCES TO RELATED APPLICATIONS

This is a Divisional Application of the patent application Ser. No. 11/011,757, filed Dec. 15, 2004, which is a continuation-in-part of application Ser. No. 10/765,202 filed on Jan. 28, 2004, which claims the benefit under 35 U.S.C. 119(e) of provisional application 60/443,655, filed on Jan. 30, 2003, the entire contents of which being incorporated herein by reference.

CROSS REFERENCE TO RELATED APPLICATIONS

This application is a continuation in part of U.S. application Ser. No. 10/765,202, entitled "Sub-Symbol Parallel Interference Cancellation" and filed on Jan. 28, 2004, which claims the benefit under 35 U.S.C. 119(e) of provisional application 60/443,655, filed Jan. 30, 2003, entitled "Multi-User Detection Techniques for CDMA." The entire contents of these applications are hereby incorporated by reference.

BACKGROUND OF THE INVENTION

1. Field of the Invention

This invention relates generally to wireless communications and more particularly to interference cancellation in a CDMA receiver.

2. Description of the Related Art

Code Division Multiple Access ("CDMA") provides an effective communications technique for several users to share a communications channel. Unfortunately, when the channel becomes overcrowded, the conventional CDMA receiver performs poorly and multiple access interference ("MAI") can severely degrade performance. Although the optimal maximum likelihood receiver in this case is easy to describe, it is nearly impossible to implement.

Various conventional techniques examine interference cancellation at the symbol level. Symbol-level matched filters can provide a sufficient statistic for multi-user detection ("MUD") in an additive white Gaussian noise channel. This well known result concludes that the optimal user bit estimation procedure can be written at the symbol level. Accordingly, these various conventional MUD approaches use symbol-level estimation and cancellation approaches. However, these symbol-level techniques are only approximations to the optimal estimator, and there is no guarantee that these symbol level approximations fully exploit the signal structure.

Additionally, conventional procedures can involve the following computationally expensive process for canceling interference: (1) interpolating the data for each source (base station) to the sampling lattice of the signature waveform (chip center), (2) computing the bit estimates for each user, (3) synthesizing the entire symbol's binary waveform and (4) interpolating the waveform of the whole symbol back to the sampling grid of the data to perform the cancellation.

Some sample-level approaches have been proposed. One example uses a continuous time (i.e., analog) maximum likelihood estimator ("MLE") approach, which can be used as continuous decision feedback. This MLE approach can be purposed as a single-stage analog process using filters controlled by relative user power levels. Although relatively easy to implement, these approaches are not a good theoretical match to the interference cancellation problem. To remedy such shortcomings, linear minimum mean squared error (MMSE) techniques, such as those based on standard applications of the Kalman filter and other least-squares generalizations, could be used to reduce un-cancelled interference. These techniques fully couple the users (resulting in large matrix computations) and perform interference cancellations in the innovation term in the filter. Accordingly, they remain quite computationally expensive.

Another issue with regard to interference cancellation is the implementation of RAKE receivers. The RAKE technique, which is used in many conventional CDMA handsets, uses multiple base band correlators to separately process several signal multi-path components. This processing is said to be performed by fingers. Each finger is basically an individual demodulator whose timing is adjusted for a particular multi-path component. During soft-handoff, one of these fingers is actually tuned to a neighboring base station. The output of each finger is typically soft information. The receiver typically combines the soft information from each of the fingers to produce a single log-likelihood ratio for each of the transmitted bits. Various interference cancellation problems remain with RAKE implementations, including interference that is introduced by pilot signals that may or may not correspond to processing that is being performed for a finger.

Still another problem with conventional interference cancellation is the inefficient use of computational resources, which are often limited in applications such as mobile handsets. Interference cancellation techniques and corresponding computational architectures have been found to be too inflexible to take full advantage of the computational capabilities of a system in which cancellation is being performed, at various stages of signal processing.

Thus, there remains a need for more efficient interference cancellation, particularly in receivers that implement RAKE processing, and for more efficient allocation of computational resources in typical applications.

SUMMARY OF THE INVENTION

According to one aspect, the present invention provides for the cancellation of interference in a receiver that implements RAKE processing. Data is received as a plurality of discrete values produced at a sub-symbol interval that is less than a full symbol period. A set of signal parameters such as the code delay and complex amplitude are maintained for each of a plurality of fingers corresponding to RAKE demodulation provided in the receiver. A plurality of synthesized pilot signals are estimated based upon the received data and the signal parameters, preferably by interpolating waveforms for respective ones of the plurality of synthesized pilot signals to a common sampling lattice of the received data. The estimated pilot signals are then canceled from the input signal.

According to another aspect, the present invention provides adaptive allocation of computational resources in real time processing of a communications signal. In this aspect, a stream of data corresponding to a communication signal is received. The stream of data is subject to a time-critical process that includes demodulation of the signal, as well as a non-time-critical process such as interference cancellation. Specifically, the completion of the time-critical process for the received stream of data is ensured, whereas the non-time-critical process is adaptively applied, subject to ensuring the completion of the time-critical process.

In one embodiment, ensuring completion of the time-critical process and adaptively applying the non-time-critical process is carried out by providing a series of buffers for blocks of data that are processed. This may comprise loading a first buffer with a first block from the stream of input data, a second buffer with a second block from the stream of input data, and ensuring the completion of the time-critical process for the block in the first buffer prior to receiving an indication that a third buffer has been filled with a third block of data from the stream of input data.

It may further comprise applying the non-time-critical process to the second block following completion of the time-critical process for the first block but prior to the indication that the third buffer has been filled with the third block of data.

The time-critical process may also include code tracking for RAKE fingers in addition to demodulation. There, the buffering may include loading a first buffer with a first block from the stream of input data, a second buffer with a second block from the stream of input data, and ensuring the completion of demodulation for the first block and code tracking for the second block prior to receiving an indication that a third buffer has been filled with a third block of data from the stream of input data.

The present invention can be embodied in various forms, including computer implemented methods, computer program products, communications systems and networks, receivers, transmitters and transceivers, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

The previously mentioned application Ser. No. 10/765, 202, entitled "Sub-Symbol Parallel Interference Cancellation" implements multi-user detection to cancel multi-access interference and thereby improve reception. According to one aspect of the present invention, the signal-to-interference ratio is improved by canceling only the pilot channels, thereby avoiding the need to estimate the transmitted bits. The pilot channels are observed as channels with known bits. Preferably, this performance improvement implements the interpolation technique described in application Ser. No. 10/765,202, which allows the cancellation to be effectively performed at the sampling lattice of the sampled data.

Figure 1:
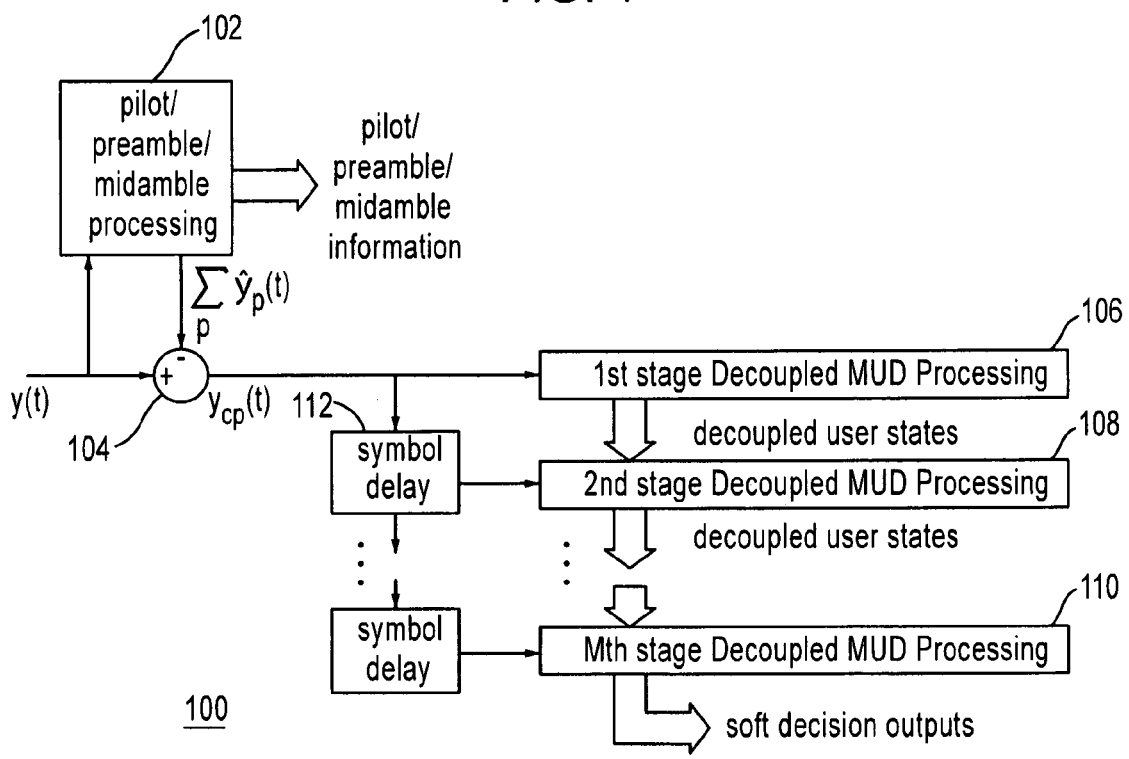
FIG. 1 is a schematic diagram illustrating an embodiment of multiple stage decoupled MUD processing.
Figure 2:
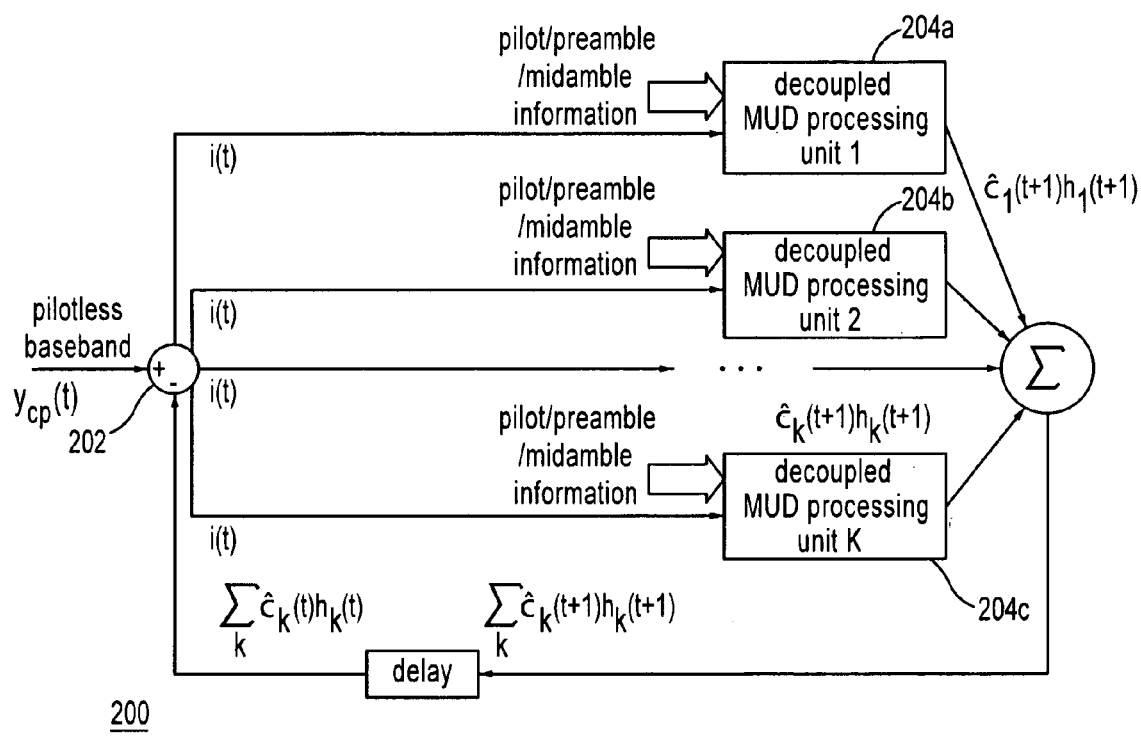
FIG. 2 is a schematic diagram illustrating an embodiment of a stage of decoupled MUD processing.
Figure 3:
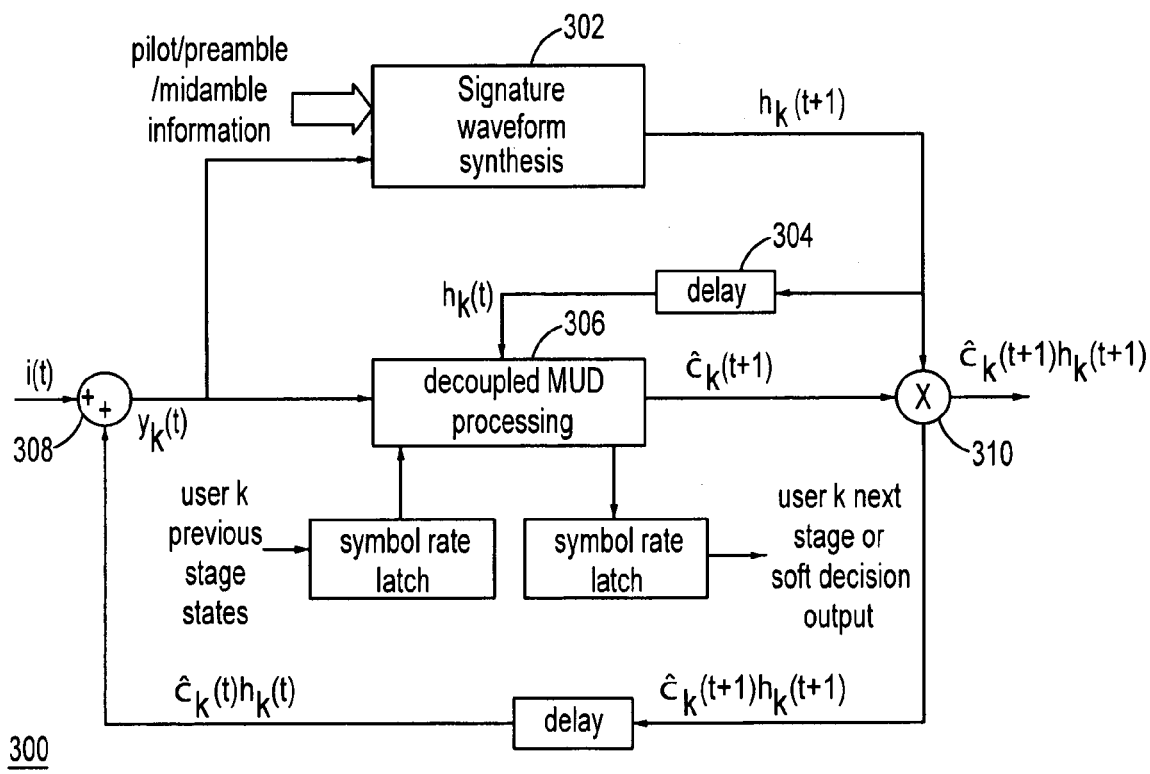
FIG. 3 is a schematic diagram illustrating an embodiment of a decoupled MUD processing element.

FIGS. 1-3 illustrate an example of the interpolation technique in multi-user detection (MUD) applications. Specifically, FIGS. 1-3 are schematic diagrams that respectively illustrate multiple stage decoupled MUD processing 100, a single stage of MUD processing 200 in more detail, and a MUD processing element 300 in still more detail. The schematic diagrams illustrate both the flow of such processing as well as an embodiment of modular architecture for the same.

FIG. 1 illustrates an embodiment of multiple stage decoupled MUD processing 100, particularly showing how pilot interference is cancelled and then applied in a multistage setting (other implementations can use one stage). The multiple stages may apply the same decoupled MUD algorithm, or, in a hybrid setting, may use different MUD algorithms for the different stages. Initially, pilot, preamble, and mid-amble information is processed 102, if present. Information such as timing and channel equalization is shared with other blocks as needed, since in many settings multiple users will share pilots. The pilot/preamble/mid-amble signals are also reconstructed and used to cancel 104 their contribution to multi-access interference, resulting in $y_{cp}(t)$, the base band signal after cancellation of pilots. This signal is provided to the first stage of decoupled MUD 106, which estimates $\hat{c}_k(t)$ and other user state information as needed to provide transformation between stages. This process is described in more detail in FIG. 2. With a one symbol delay 112, the $1^{st}$ stage symbol estimates (and supporting data) are used to seed the $2^{nd}$ stage MUD 108, and so on. The final stage MUD 110 provides the soft decision outputs.

In the context of this example, the pilot information is estimated and the pilot signal is cancelled before user multi-access interference is estimated and removed. This is suggested when the pilots are strong enough to estimate the needed information. In some cases, the pilot information should be re-estimated and pilot signals re-cancelled after the intermediate stages of interference cancellation. This is advantageous, for example, when near-far problems cause weak pilots to be obscured by strong pilots and user signals.

FIG. 2 illustrates an embodiment of a stage of MUD processing 200. Based on estimates $\hat{c}_k(t)$ of the constellation symbol, the interference cancellation is achieved by subtracting 202 the current interference estimate from the pilot-less base band signal to form i(t), the innovation signal. This innovation signal represents the original signal y(t) with all known multi-access interference removed. The separate MUD processing units are coupled only through this interference cancellation; inside of MUD processing units, the contribution of the un-cancelled interference from other users is viewed as additive noise. Scalar equations for each MUD processing unit then result, in contrast to standard approaches that result in large matrix equations.

The interference cancellation occurs on the discrete sub-symbol sampling lattice, instead of using interpolation to move these measurements to chip center for each user or using symbol-level sampling. The decoupled processing units 204a-c use i(t) and any pilot/preamble or mid-amble information to produce an estimate $\hat{c}_k(t+1)h_k(t+1)$ for this user's contribution to MAI at the next sample time.

FIG. 3 illustrates an embodiment of a decoupled MUD processing element 300. Again, the coupling of separate users' processing units occurs through the innovation i(t), and the signal reconstruction $\hat{c}_k(t+1)h_k(t+1)$ occurs at the discrete sub-symbol timescale which is common for each user's processing unit. The signature waveform synthesis module 302 uses equalization and timing information, if available, from embedded pilots, preambles, mid-ambles, and so on. Through application of a one time step delay 304, the decoupled MUD processor 306 and signal reconstruction 310 share a single calculation of $h_k(t+1)$. The decoupled MUD Processor 306 uses its internal state information and the new measurement $$y_k(t) = y(t) - \sum_{p=1}^{P} \hat{y}_p(t) - \sum_{l=1, l \neq k}^{K} h_k(t) \hat{c}_k(t) + v(t)$$

to make an estimate of the constellation symbol $\hat{c}_k(t+1)$, where v(t) represents noise. The addition 308 of the estimated multi-access interference $\hat{c}_k(t) h_k(t)$ restores the contribution of user k and simplifies the algorithm flow to produce $y_k(t)$ in the decoupled MUD processing. Although one embodiment is described, other functionally equivalent designs can be used for FIGS. 2-3.

Another aspect of this technique is that the residual term $$\sum_{p=1}^{P} (y_p(t) - \hat{y}_p(t)) + \sum_{l=1, l \neq k}^{K} h_k(t)(c_k(t) - \hat{c}_k(t)) + v(t)$$

is viewed as additive noise during signal processing, which leads to substantial savings in computational complexity when compared to fully coupled techniques. The internal states of the decoupled processor maintain the information needed to generate an estimate of the constellation point $\hat{c}_k(t)$ at each sub-symbol time step t. The decoupled MUD processor block produces an estimate at each t, instead of waiting until the end of a symbol period. This significantly improves cancellation at each pass and improves computational efficiency by allowing reuse of signature waveforms for both demodulation and reconstruction even when applying more traditional algorithms (such as classic parallel interference cancellation) in the decoupled MUD processor. In the signature waveform synthesis module 302, the signature waveform is interpolated to the sub-symbol sampling lattice of the data, rather than interpolating the data $y_k(t)$ to a user k-based sampling grid, such as chip center. This produces a substantial reduction in complexity in many cases, since the $h_k(t+1)$ interpolation can often be implemented with binary lookup tables, in contrast to fixed point filters for interpolating $y_k(t)$ to a different chip center grid for each user.

Figure 4:
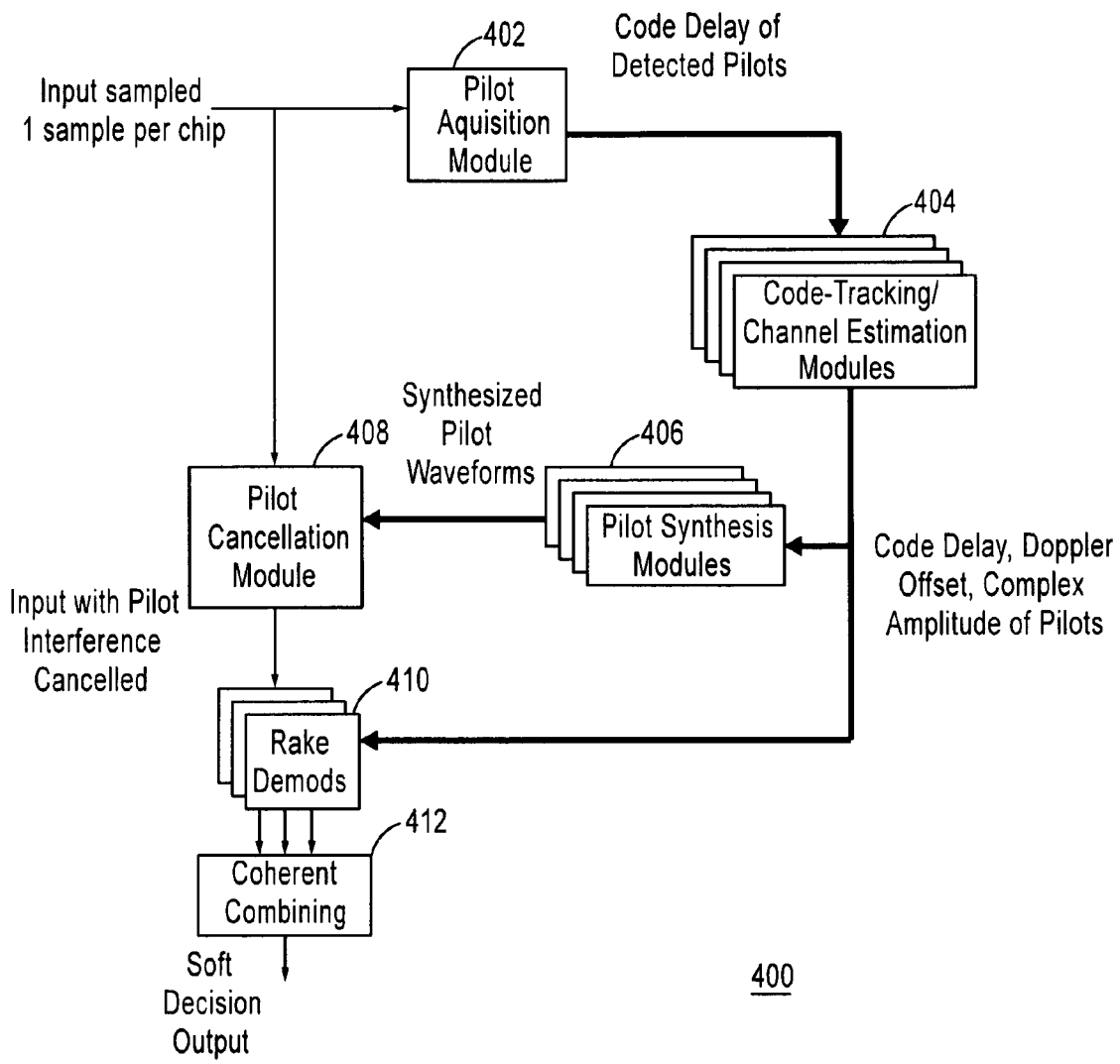
FIG. 4 is a block diagram illustrating an embodiment of a receiver that includes pilot cancellation corresponding to inactive fingers in accordance with the present invention.

As indicated above, one aspect of the invention involves canceling pilots with code offsets that are not among the currently active fingers. FIG. 4 is a schematic diagram illustrating an embodiment of a receiver 400 that includes pilot cancellation corresponding to inactive fingers in accordance with the present invention. Generally, the receiver 400 accommodates a determination of the pilots that are not being used by any currently active finger, and corresponding cancellation of those pilots (sometimes one, possibly more). In conjunction with the described interpolation technique that is also implemented by the receiver 400, a useful interference cancellation is accommodated at a reasonable computational cost.

The illustrated receiver 400 includes a pilot acquisition module 402, code tracking/channel estimation (CTCE) modules 404, pilot synthesis modules 406, a pilot cancellation module 408, RAKE demodulators 410, and a coherent combination module 412, which is a conventional module that is used to coherently add the signals from the fingers.

The receiver 400 internals, including the described functionality, may be provided as software, hardware, firmware, or any possible combination of hardware, firmware and/or software. The receiver 400 may also be variously implemented using an Application-Specific Integrated Circuit (including System-on-a-Chip (SoC) embodiments), on a Digital Signal Processor, or on any system that includes elements for executing instructions stored in memory. Implementation may depend on ease of integration with the overall system design. The receiver 400 may also be provided in conjunction cellular phones that implement conventional housings and related equipment such as antennas, power supplies, and displays.

The pilot acquisition module 402 determines the code delay of each pilot. The CTCE modules 404 maintain the code delay, Doppler offset, and complex amplitude of each pilot. The pilot acquisition module 402 and CTCE modules 404 may respectively implement any conventional technology for code delay determination and maintenance of the code delay, Doppler offset and complex amplitude. The pilot synthesis modules 406 produce replicas of the transmitted waveforms at the estimated code delays, Doppler offsets and complex multiplied by the channel's estimated complex amplitude, and the pilot cancellation module 408 removes these pilots from the original signal. The RAKE demodulators 410 respectively perform the demodulation of the provided signals.

In CDMA Standards, such as IS-95 and CDMA2000, each base station transmits a pilot channel. In the case of those standards, the pilot channel transmits a known periodic pseudo-random sequence of 32,768 chips. The pilot acquisition module 402 correlates a portion of the received signal with a portion of the known pilot signal at each of the possible positions and if the amplitude of the correlation is strong enough, it determines that a base station exists at that offset. In this fashion, the receiver 400 attempts to communicate with the base station whose pilot has the strongest correlation. Nearby base stations are typically required to have a minimum offset because in the case of multi-path, the reception from a different path of base stations transmission would appear as another pilot several chips away from the strongest. The CTCE modules 404 are each equipped to perform code tracking on the strongest pilot and some of its multi-path components.

The pilot acquisition module 402 continuously scans for new pilots, and often scans those positions which were strong but not the strongest because these represent nearby base stations that could potentially become the strongest and used in soft handoff. There is a threshold called T_ADD when a pilot becomes strong enough to be involved in soft handoff. When this happens, the receiver 400 can go into soft handoff mode where it can simultaneously receive its transmission from two base stations. When the receiver 400 is not in soft handoff mode, it only receives its signal from one base station.

Many existing receivers maintain code tracking on the strongest pilot and two multi-path pilots, which have nearby offsets. The code tracking system for each of the three pilots combined with the demodulator for the information channel received on each of the three components are called fingers. In the case where the receiver tracks the pilot and demodulates an information channel from three different multi-path components, it is said that the RAKE receiver has three fingers. The demodulated soft information from each of the three fingers is coherently combined to improve the demodulated signal-to-interference ratio leading to a lower error rate.

In soft handoff mode, instead of tracking and demodulating the signal from one of the multi-path components, one of the fingers instead tracks and demodulates the signal from another base station. This allows the network to perform soft handoff between two base stations.

To accommodate this functionality, the code delay, amplitude, phase and Doppler offset of the corresponding multi-path component are typically maintained for each finger. The receiver 400, particularly through the pilot synthesis modules 404 and pilot cancellation module 406 uses this information to cancel the interference from the pilot signals in the received signal, preferably using the above described interpolation technique. The allows the RAKE receiver 408 to see significant improvement in signal-to-interference ratio at its input. The pilot cancellation functionality may be undertaken to cancel as many pilots as can be afforded according to design constraints and the computational capabilities of the receiver 400.

In parallel, the cancellation technique may also be implemented by additional fingers to track other pilots (or multi-paths), and to also cancel these pilots from the input signal, to provide further cancellation of unwanted pilots.

For ease of description, and in some embodiments, the fingers are separated into code tracking units and demodulators. Each of the code tracking modules 404 uses a delay-locked loop, also called an early-late gate, to maintain the code delay. Each unit also estimates the amplitude and phase (or real and imaginary) parts of the channel, and preferably the Doppler offset. Preferably, there is a code-tracking unit for each component (e.g., pilot) for which cancellation is to be performed. The RAKE demodulators 410 operate on the interference-cancelled signal and decode the information channel at one of several offsets. As indicated in the figure, in one embodiment there is one code-tracking unit per demodulator. Alternatively, there could be more code tracking units than there are demodulators, to track additional pilots for cancellation. It should be understood that multiple code tracking units and demodulators may be conceptual modules respectively found within single "code tracking" and "demodulation" modules that perform the described processes.

In order to cancel pilot signals, the code delay, amplitude, phase and Doppler Offset (if not available, assume 0) of each component are sent to a synthesis unit. The code delay may be to an accuracy, such as 1/16th of a chip. In order for the synthesis unit to synthesize the pilot waveforms at the sampling periods of the incoming waveform, a fractional interpolation unit is used. The details of this fractional interpolation approach are described in connection with FIGS. 1-3 above.

Another aspect of this invention, which will be useful particularly where information bearing channels are cancelled, is the adaptive allocation of computational resources. Many receivers are implemented in software in a processor. In a typical system, the receiver processing must be real-time so the processing of a block of data is performed using a double buffer. In this case, one buffer is being filled with input data, while the receiver processes the other. The receiver must finish the processing before the input data buffer is filled, because it must release its data buffer for more input samples. When the input data buffer is filled, an interrupt is generated, and the receiver begins processing the new data buffer, and the previous data buffer is filled with input. When the receiver finishes processing a data buffer, it typically terminates its process and the real-time operating system or kernel can allow other functions to be performed.

Figure 5:
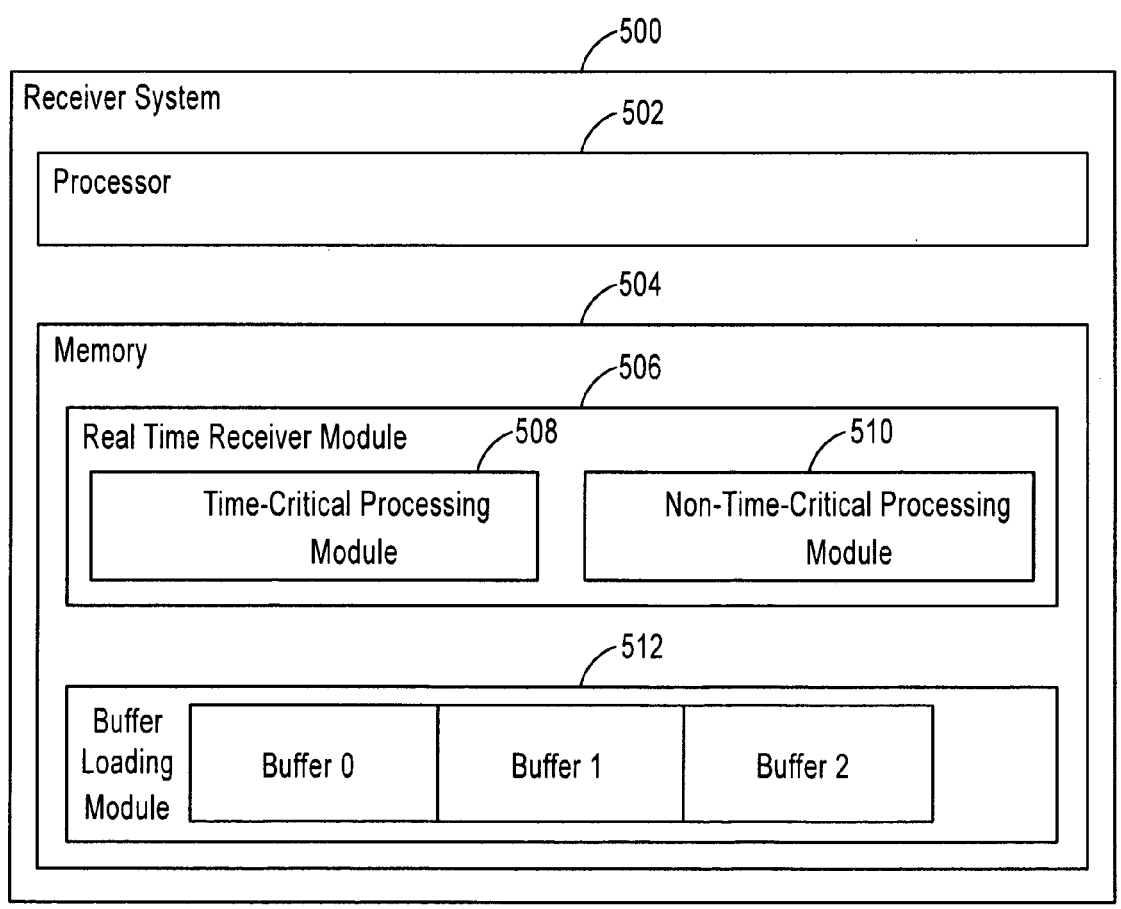
FIG. 5 is a block diagram illustrating an embodiment of a receiver that includes elements for adaptively allocating computational resources in interference cancellation processing in accordance with the present invention.

In the present invention, the input blocks are triple buffered. The processing blocks may be referred to as "blocks", "buffers" or the like. FIG. 5 is a block diagram illustrating an embodiment of a receiver system 500 that includes elements for adaptively allocating computational resources in interference cancellation processing in accordance with the present invention. The receiver system 500 preferably implements software, but may also comprise hardware or firmware, or any combination of hardware, firmware and software elements. Although one modular breakdown is illustrated, it is noted that the same functionality may be provided by a system having greater, fewer, or differently named components.

The system is shown to include a processor 502 as well as a memory 504 configured to include a real time receiver module 506 that further includes a time-critical processing module 508 and a non-time-critical processing module 510. The real time receiver module 506 may also include additional conventional components that are not necessary for an understanding of this aspect of the present invention. A buffer module 512 manages the loading of buffers that are processed, with Buffer 0, Buffer 1 and Buffer 2 conceptually indicated.

Consider that the blocks are indexed so Buffer N+2 follows Buffer N+1 which follows Buffer N. While Buffer N+2 is being loaded, the real-time receiver process runs the RAKE demodulator on Buffer N and performs the required Code Tracking for the RAKE fingers for Buffer N+1. When the real-time receiver process finishes, the processor can use the remaining cycles to process Buffer N+1 to cancel the pilots associated with the fingers, and perform additional code tracking and/or cancellation on other pilots. If there are enough excess cycles, the receiver also performs multi-user detection and interference cancellation of information bearing channels as previously described, and described further in application Ser. No. 10/765,202. This can be performed until an interrupt is generated by the completed Buffer N+2, in which case the extra cancellation is halted and the real-time receiver process begins running the RAKE demodulator on Buffer N+1 and the required Code Tracking on Buffer N+2, while Buffer N is loaded with the next block, which was the same size block conceptually occupying Buffer N+3. The net result is that depending upon the processor loading on other processes such as the display or other functions, the receiver can adapt the amount of interference cancellation to make optimal use of the computational resources.

Those processes that are needed to allow a device to provide viable communications functionality should be considered as time-critical processes. For example, a cellular phone provides voice communications. To accommodate this, demodulation is a time-critical process. CTCE for the pilots of the fingers is also a time-critical process. Interference cancellation (and, optionally, further code tracking for additional pilots) is a non-time-critical process. Time-critical and non-time-critical processes may be determined according to expected operation and design considerations. Other examples of time-critical processing for a cellular phone may be decoding of the voice signal, or anything that is needed to make the phone operate like a phone. Other examples of non-time critical processing may include processes like image processing and maintenance to install new software.

Conceptually this aspect of the present invention may be thought of as using three block sized buffers to accommodate three types of tasks, namely collecting a block of data, performing non-time-critical processing, and performing time-critical processing. The first task is collecting data that needs to be processed and may also be referred to as data acquisition. The third task is the processing that must be performed to provide viable functionality.

This aspect of the present invention provides a system that accommodates as much interference cancellation as can be accomplished during periods where time-critical processing is not necessary. Specifically, if the processor has completed the time-critical processing on block 3 before it is required to perform the time-critical processing on block 2, then additional non-critical time processing may be applied to block 2 before it must be passed along for time-critical processing. This allows the system 500 to improve the interference cancellation that is performed on a block of data, by applying more computational resources to such a task when they become available.

Figure 6:
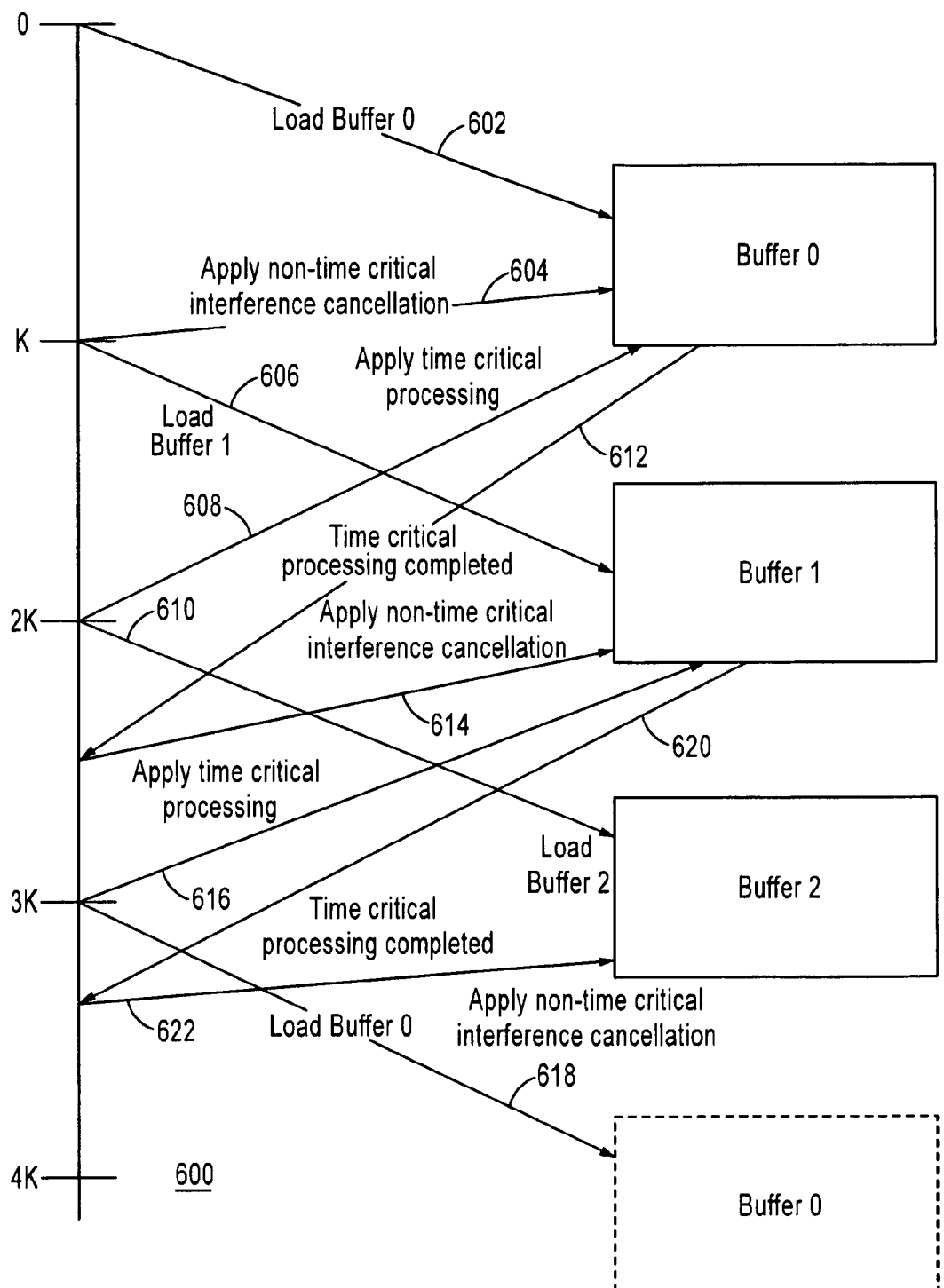
FIG. 6 is a flow diagram illustrating an embodiment of a process for adaptively allocating computational resources in accordance with the present invention.

FIG. 6 is a flow diagram illustrating an embodiment of a process 600 for adaptively allocating computational resources in accordance with the present invention. A timeline indicates various junctures at "K" intervals, namely time 0, K, 2K, 3K, 4K, etc. K will typically be an integer number of symbols in units of chips. One example is 512 chips, which corresponds to 8 symbols according to the IS95 standard.

The buffer is loaded by an A/D converter. Various actions are illustrated along the time line, starting at time 0. the A/D converter is illustrated as loading Buffer 0 with data from time 0 through point K. When the buffer is loaded, the processor is interrupted to indicate that the data is ready for processing.

Note that the timeline of FIG. 6 is somewhat simplified for ease of illustration. Accommodation for delays or clocking of results completed elsewhere. Thus, for example, the loading of Buffer 0 may actually be performed from 0 through K⁻ to leave one cycle for such an accommodation. Loading the Buffer 0 as described is the first "data acquisition" task as described above. Also, although discrete milestones and actions are illustrated, it should be understood that the sequence of loading and allowing access to the processor may be variously provided, such as by using a DMA coprocessor that begins moving buffer content into memory when a half full flag indicates that the buffer is half full.

In the first iteration of the process, the data must be loaded before the other tasks are undertaken. In subsequent iterations, the various tasks will be simultaneously undertaken, as described in connection with the "refilling" of Buffer 0 (step 618) below.

From time K through 2K, the non-time-critical interference cancellation is applied 604 to the data in Buffer 0, and Buffer 1 is loaded 606 with the next sequential set of data. Although any interference cancellation may be performed, in one embodiment the previously described sub-symbol parallel interference cancellation is performed on the data. Other examples of interference cancellation include but are not limited to pilot-only cancellation, serial interference cancellation, partial parallel interference cancellation, etc.

From time 2K through 3K, the A-D converter populates 610 Buffer 2, and time-critical demodulation is initiated and applied 608 to the data in Buffer 0. At the same time, any processing time prior to the interrupt at time 3K is used for the application 614 of non-critical interference calculation to the data in Buffer 1 as indicated. For ease of illustration, a discrete indication that time-critical demodulation has been completed 612 and a subsequent initiation of the application 614 of the non-critical interference calculation is provided. The illustration indicates how a chunk of time remains in period 2K-3K despite the allocation of computational resources to fully complete the time-critical component of processing. There may be instances where there is not a discrete, shared end-point for the critical processing, and starting-point for non-critical processing.

Moving along the timeline, from 3K to 4K, buffer 0 can again be loaded 618 since the time-critical demodulation of the data contained therein has been completed. Time-critical demodulation is applied 616 to the data in Buffer 1. Finally, as described regarding the previous buffers in connection with the preceding time period, remaining processing resources prior to time 4K are allocated to application 622 of non-critical interference cancellation to the data in Buffer 2. It is again shown following completion 620 of time-critical processing, but the guaranteed allocation of resources to time-critical processing, and corresponding allocation of remaining resources in the period to non-time-critical processing may be dispersed throughout the period if desired. For example, shared processing during a K length period that guarantees the completion of the time-critical processing and allows the non-time-critical processing during some remainder of the period is equally applicable in accordance with embodiments of the present invention.

Thus embodiments of the present invention produce and provide improved interference cancellation in a CDMA communications environment, particularly in the context of RAKE processing, and provide improved allocation of computational resources. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for canceling interference in a receiver in a communications system that implements RAKE processing, the method comprising:
   receiving, by a processing unit, a set of data that provides a plurality of discrete values produced at a sub-symbol interval that is less than a full symbol period;
   maintaining, by the processing unit, a set of signal parameters corresponding to each of a plurality of fingers corresponding to RAKE processing implemented by the receiver;
   estimating, by the processing unit, a plurality of synthesized pilot signals based upon the received set of data and the set of signal parameters by interpolating waveforms for respective ones of the plurality of synthesized pilot signals to a common sampling lattice of the received set of data; and
   canceling, by the processing unit, the estimated plurality of synthesized pilot signals.

2. The method of claim 1, wherein the set of signal parameters includes code delay and complex amplitude.

3. The method of claim 1, wherein the communications system is a code division multiplex access communications system.

4. The method of claim 1, wherein the communications system is an asynchronous code division multiplex access communications system.

5. The method of claim 1, wherein the sub-symbol interval is a chip interval.

6. The method of claim 5, wherein the interpolation of waveforms is used to perform signal reconstruction for a first sub-symbol interval and is retained to estimate bits in a second sub-symbol interval that follows the first sub-symbol interval.

7. The method of claim 6, wherein a sub-symbol delay accommodates concurrently retaining the interpolated waveform for bit estimation in the second sub-symbol interval and for signal reconstruction for the first sub-symbol interval.

8. An apparatus in a communications system that provides interference cancellation in conjunction with RAKE processing, the apparatus comprising:
 a processing unit; and
 a memory, the memory storing program code executable by the processing unit to perform operations comprising:
 receiving a set of data that provides a plurality of discrete values produced at a sub-symbol interval that is less than a full symbol period;
 maintaining a set of signal parameters corresponding to each of a plurality of fingers corresponding to RAKE processing implemented by the receiver;
 estimating a plurality of synthesized pilot signals based upon the received set of data and the set of signal parameters by interpolating waveforms for respective ones of the plurality of synthesized pilot signals to a common sampling lattice of the received set of data; and
 canceling the estimated plurality of synthesized pilot signals.

9. The apparatus of claim 8, wherein the set of signal parameters includes code delay and complex amplitude.

10. The apparatus of claim 8, wherein the communications system is a code division multiplex access communications system.

11. The apparatus of claim 8, wherein the communications system is an asynchronous code division multiplex access communications system.

12. The apparatus of claim 8, wherein the sub-symbol interval is a chip interval.

13. The apparatus of claim 12, wherein the interpolation of waveforms is used to perform signal reconstruction for a first sub-symbol interval and is retained to estimate bits in a second sub-symbol interval that follows the first sub-symbol interval.

14. The apparatus of claim 13, wherein a sub-symbol delay accommodates concurrently retaining the interpolated waveform for bit estimation in the second sub-symbol interval and for signal reconstruction for the first sub-symbol interval.

15. A computer program product for canceling interference in a receiver in a communications system that implements RAKE processing, the computer program product stored on a non-transitory computer readable medium and adapted to perform operations comprising:
 receiving a set of data that provides a plurality of discrete values produced at a sub-symbol interval that is less than a full symbol period;
 maintaining a set of signal parameters corresponding to each of a plurality of fingers corresponding to RAKE processing implemented by the receiver;
 estimating a plurality of synthesized pilot signals based upon the received set of data and the set of signal parameters by interpolating waveforms for respective ones of the plurality of synthesized pilot signals to a common sampling lattice of the received set of data; and
 canceling the estimated plurality of synthesized pilot signals.

16. The computer program product of claim 15, wherein the set of signal parameters includes code delay and complex amplitude.

17. The computer program product of claim 15, wherein the communications system is a code division multiplex access communications system.

18. The computer program product of claim 15, wherein the communications system is an asynchronous code division multiplex access communications system.

19. The computer program product of claim 15, wherein the sub-symbol interval is a chip interval.

20. The computer program product of claim 19, wherein the interpolation of waveforms is used to perform signal reconstruction for a first sub-symbol interval and is retained to estimate bits in a second sub-symbol interval that follows the first sub-symbol interval.

21. The computer program product of claim 20, wherein a sub-symbol delay accommodates concurrently retaining the interpolated waveform for bit estimation in the second sub-symbol interval and for signal reconstruction for the first sub-symbol interval.

* * * * *